United States Patent [19]
Nishina

[11] 3,803,719
[45] Apr. 16, 1974

[54] HEIGHT GAUGE COMPRISING A COUNTER AND A DIAL GAUGE

[75] Inventor: Shingo Nishina, Kawasaki, Japan
[73] Assignee: Yehan Numata, Yokohama, Japan
[22] Filed: Aug. 13, 1971
[21] Appl. No.: 171,470

[30] Foreign Application Priority Data
Dec. 30, 1970 Japan.............................. 45-139902

[52] U.S. Cl............................................. 33/172 R
[51] Int. Cl. ............................................. G01b 5/00
[58] Field of Search .......... 33/169 R, 172 R, 125 R, 33/125 A

[56] References Cited
UNITED STATES PATENTS
2,846,769  8/1958  Colont ............................. 33/125 R
3,213,360  10/1965  Cook et al...................... 33/172 E X
1,617,485  2/1927  Hughes ............................ 33/172 R FOREIGN PATENTS OR APPLICATIONS
230,727  4/1944  Germany........................... 33/169 R
996,095  6/1965  Great Britain ...................... 33/170

Primary Examiner—Robert B. Hull
Attorney, Agent, or Firm—Brisebois & Kruger

[57] ABSTRACT

The present invention relates to a height gauge with a counter and a dial gauge, said height gauge comprising face-to-face racks attached to two pillars, and pinions which drive the dial gauge and the counter and are mounted on a slider engaging said racks.

4 Claims, 6 Drawing Figures

HEIGHT GAUGE COMPRISING A COUNTER AND A DIAL GAUGE

SUMMARY OF THE INVENTION

The present invention relates to a height gauge comprising a counter and a dial gauge.

In conventional height gauges, a slider is slidably mounted on the major beam, and a stationary rack on the major beam engages the pinion of the dial gauge attached to the slider. Under this arrangement, a broad reading is given by the scale on the major beam and the relative position of the slider on said beam; and a fractional reading is given by the dial gauge pointer. It has, however, the following drawbacks: the scale reading lacks rapidity, the major beam is liable to warp, and the rack is liable to be clogged with dust, resulting in poor movability of the slider and poor maintenance of precision.

The primary objective of the present invention is to provide a height gauge characterized by high precision, rapidity of scale reading, and freedom from warping of the beam, which is constituted by two cylindrical pillars mounted on a base, racks extending longitudinally of each of these pillars, which racks engage the pinion connected to the dial pointer and the pinion connected to the drive gear of the counter, with the measurement being given by a reading of the counter and the dial gauge scale.

Another objective of the present invention is to provide a height gauge, in which flexible bellows covering the two pillars are mounted between the slider and the base and between the slider and the fixed frame, thereby protecting the racks on the pillars from clogging with dust, etc.

Other objectives of the present invention will become apparent from a reading of the description of one embodiment of the invention, with reference to the accompanying drawings, in which.

Figure 1:
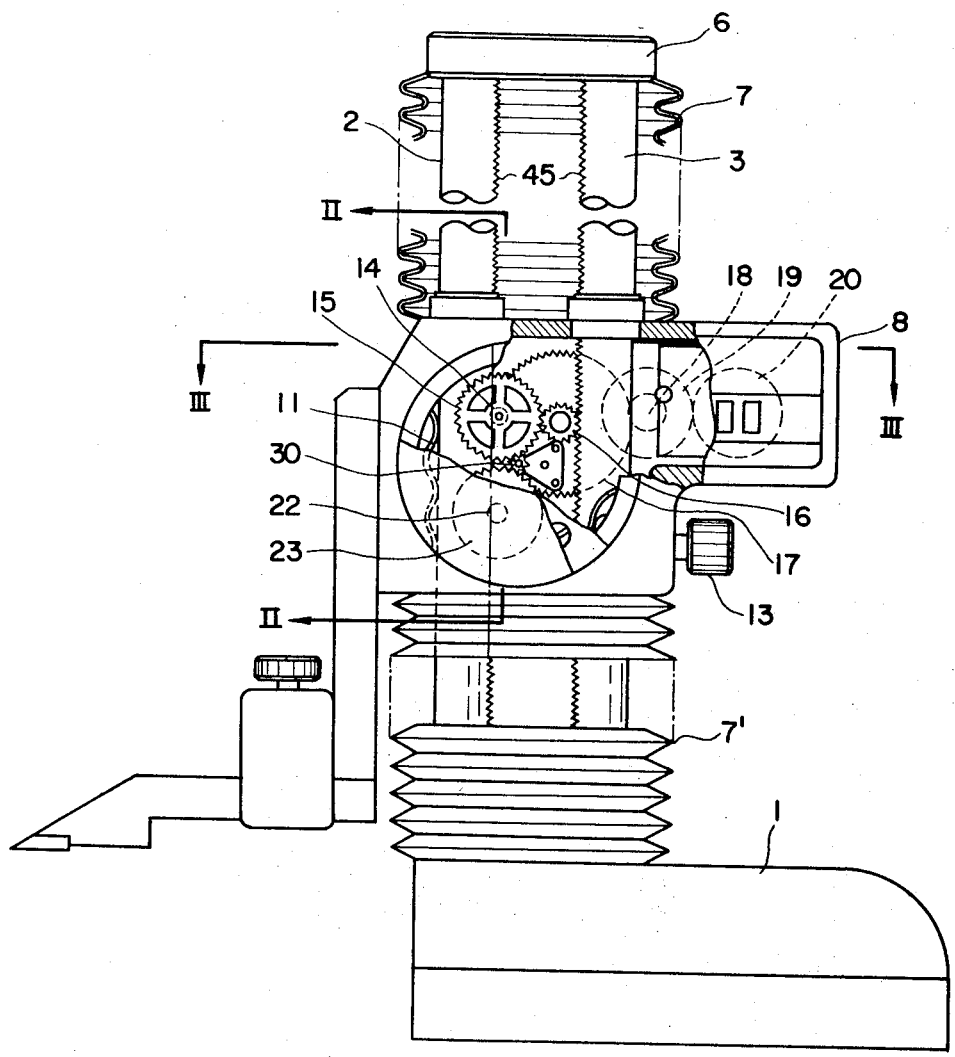
FIG. 1 is a partially cut-away elevational view of the device according to the present invention.
Figure 2:
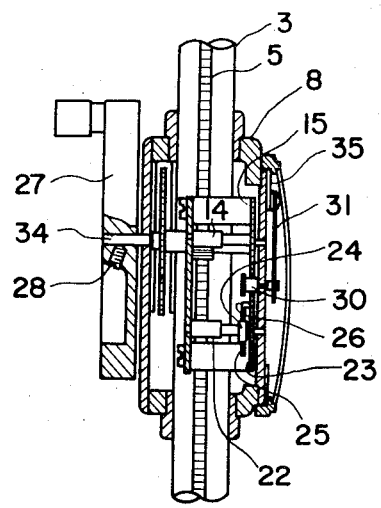
FIG. 2 is a sectional view taken along the line II—II of FIG. 1.
Figure 3:
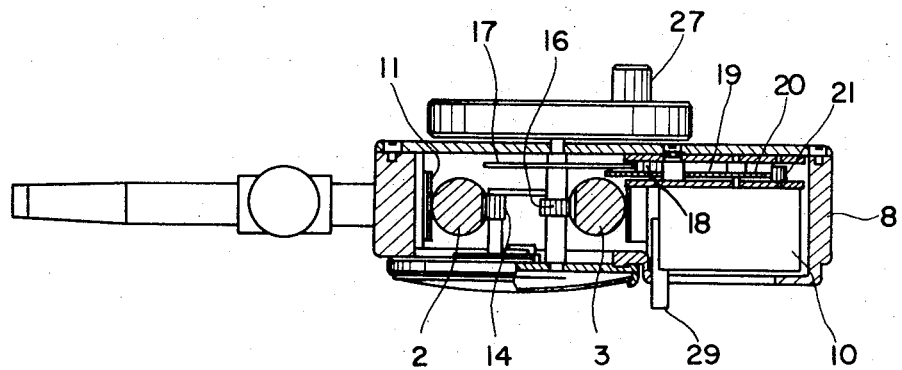
FIG. 3 is a sectional view taken along the line III—III of FIG. 1.

Two cylindrical pillars 2, 3 are horizontally spaced on a base 1 and the tops of these pillars are held securely by a frame 6. The two pillars are provided with longitudinal racks 4, 5, which face each other.

A slider 8 is slidably mounted on said pillars and is frictionally maintained in position thereon by a spring 11 positioned between the pillar 2 and the slider 8. The slider 8 can be clamped to any appropriate point on the pillar by means of a set screw 13. Between the slider 8 and the base 1, and between the slider 8 and the frame 6 are flexible bellows 7, 7' encircling the two pillars 2,3. Inside of the slider 8 is a pinion 14 which is rotatably mounted on said slider so as to engage the rack 4 on the pillar 2. The pinion 14 is fixed on the same shaft as the gear 15, and the gear 15 meshes with the pointer pinion 30 carrying a pointer 31. The pointer 31 is movable on the dial 32, which is freely rotatable relative to the slider together with the cover frame 33, to which said dial 32 is fixed.

The pointer pinion 30 meshes with another gear 23 as well as with the gear 15. A pressure pin 26 bears on the inner rim of said other gear 23 and this pin 26 is connected to the end of a hair spring 25 wound around a pin 24 carried by a pinion 22 which meshes with the rack 4. The other gear 23 is mounted to rotate on and with respect to the shaft of the pinion 22. When said other gear 23 drives the pointer pinion 30, said other gear is turning in such a direction as to exert tension on the hair spring 25 and backlash can thereby be eliminated.

The rack 5 on the pillar 3 meshes with the pinion 16, which is fixed to the same shaft as the large gear 17. A set-screw 28 fastens a drive handle 27 to the outside of the slider 8.

The large gear 17 meshes with the pinion 18, which has a gear 19 fastened to the same shaft. The gear 19 meshes with another gear 20 in engagement with the counter pinion 21 of the counter 10.

Figure 4:
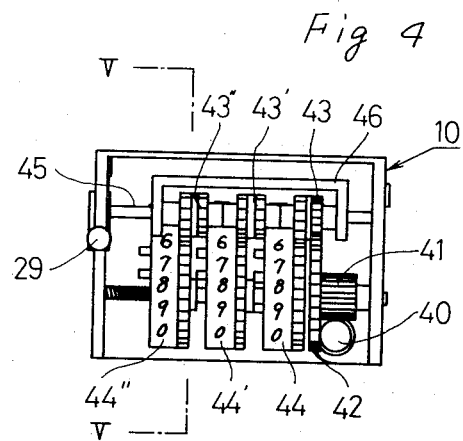
FIG. 4 is a detail view of the counter 10.
Figure 5:
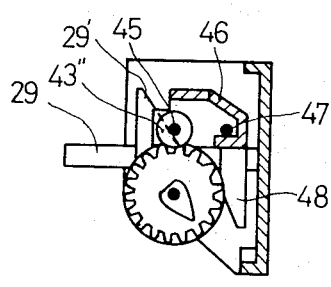
FIG. 5 is a sectional view, taken along the line V—V of FIG. 4.
Figure 6:
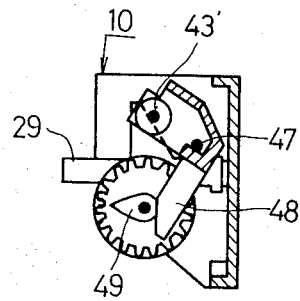
FIG. 6 is a view similar to FIG. 5, showing the counter frame 46 rotated to its cam-actuating position.

The counter 10 is equipped with a return lever 29. When this return lever is pushed, the figure on the counter 10 reverts to zero. The counter 10 has the construction shown in FIG. 4 to FIG. 6. The rotation of the counter pinion 21 causes the rotation of the worm 40 which is fixed coaxially with the counter pinion to rotate the worm gear 41. The worm gear 41 rotates the gear 42, which is integral therewith, thus rotating the driving gear 43 and, as a result, the counter ring 44 is rotated. And the driving gear 43', the counter ring 44', the driving gear 43" and the counter ring 44" are driven in turn, thereby transferring the values indicating the position of the slider. The end of the return lever 29 carries the tapered member 29', and the driving gears (43 to 43") are mounted on the same shaft 45 on which the frame 46 is mounted. As the frame 46 is pivoted relative to the frame of the counter about the axis 47, when the return lever 29 is pushed, the frame 46 is rotated via the taper 29' to shift its position from the one shown in FIG. 5 to the one shown in FIG. 6. The frame 46 is equipped with three projections, which can be moved within the clearances between the counter rings. And the counter rings (44 to 44") are equipped with the cams 49 respectively, and the configuration thereof is so formed that the cam is moved to a predetermined position when said projection 48 strikes the cam. Thus, when the projection is rotated, it is rotated to the predetermined position wherever the counter ring is positioned. If this position is predetermined to zero, the counter can be reverted to zero.

For measurement, the drive handle 27 is turned. This turns the pinion 16 to move the slide up and down. Rotation of the pinion 16 causes rotation of the counter pinion 21 through the train of gears and, as a result, the rotating wheels bearing the figures of the counter 10 are turned.

The gear ratio between the large gear 17 and the counter pinion 21 is preferably such that five units may be registered on the counter for one revolution of the pinion 16.

Vertical motion of the slider is accompanied by rotation of the pinion 14, which results in rotation of the pointer pinion 30 and movement of the pointer. The gear ratio between the dial 35 and the counter 10 is so selected that a single complete revolution of the pointer is equivalent to the movement of five counter units.

The practical advantage of this invention is that, regardless of the position which the slider occupies on the pillars, the counter can be reset to zero and, since the dial scale can be shifted, it is possible to make measurements from the midpoint of the pillar.

What is claimed is:

1. In a height gauge comprising a plurality of pillars mounted on a base, a slider slidably mounted on said pillars, and means attached to said slider for indicating the movement thereof, the improvement according to which said indicating means comprises a dial gauge and a counter for indicating both units and unit fractions, and said height gauge comprises a rack extending longitudinally of each pillar, said racks being face-to-face, one on the inside surface of each pillar, and gear trains carried by said slider and through which said indicating means are driven by said racks when said slider is moved along said pillars.

2. Height gauge as claimed in claim 1 comprising a stationary frame holding the tops of said pillars, and flexible bellows surrounding said pillars between said base and said slider, and between said slider and said frame.

3. Height gauge as claimed in claim 1 in which said dial gauge comprises a pointer driven by said pinions and a dial which is rotatably mounted on said slider so that it may be set to a zero position relative to said pointer regardless of the position of said pointer and slider.

4. Height gauge as claimed in claim 1 in which one of said gear trains comprises a pinion which is resiliently braked to prevent backlash.

* * * * *